Jan. 26, 1937.   N. K. MOUSLEY   2,068,814
FLUID FLOW CONTROL VALVE
Filed Aug. 21, 1935   7 Sheets-Sheet 5

Fig. 7

Patented Jan. 26, 1937

2,068,814

UNITED STATES PATENT OFFICE 2,068,814

FLUID FLOW CONTROL VALVE

Norman Kenneth Mousley, Birmingham, England

Application August 21, 1935, Serial No. 37,230
In Great Britain August 23, 1934

13 Claims. (Cl. 277—46)

This invention relates to a new or improved valve or cock fitting particularly adapted for controlling the flow of water in connection with water softeners.

In many types of water softeners it is necessary to provide for the flow of water through the softener in alternate directions for normal use and for cleaning and also to arrange for the regeneration of the chemicals in the softener, and for this purpose softeners are usually provided with several control taps or valves which are manipulated independently to produce the required conditions of flow. Thus the operation and maintenance of the softener requires a certain amount of skill and careful following of instructions, which is a considerable disadvantage in the case of softeners for domestic use where the softener is usually in the charge of unskilled persons who are probably unfamiliar with the different processes involved.

The object of this invention is to provide an improved fitting whereby the whole of the control of a water softener is concentrated in a single fitting which permits the carrying out of all the functions normally effected by a number of independent cocks or valves and which is partly automatic in action so that it is much simpler and more convenient to operate and facilitates the maintenance of the softener in an efficient condition.

According to the invention a valve or cock fitting particularly adapted for controlling the flow of water in a water softener consists of a body having three or more pipe connections and two or more valve seatings engaged by movable closure members to control internal passages in the body establishing communication between the pipe connections, one or more of the closure members selectively controlling the flow of water in more than one direction.

For most types of softener the fitting will also have an outlet leading to atmosphere or to a drain and controlled by one or more of the closure members.

Two or more of the closure members may if desired be operated simultaneously by one control member or the control members may be interconnected to ensure the correct interdependent operation of the closure members.

Any suitable type of closure member may be employed, and in some forms of the fitting certain of the control members may operate spindles carrying a washered head engaging a seating and one or more rings, pistons, plungers or sleeves controlling ports in the body of the fitting. Alternatively double-beat or diverting valves may be arranged to control opposed seatings or ports.

The fitting is designed throughout with due regard to the requirements of public water undertakings, the valve seatings and closure members all being of a type approved for general use in the control of water from supply mains.

Some practical forms of fitting in accordance with my invention have been illustrated by way of example in the accompanying drawings in which:—

Figure 1:
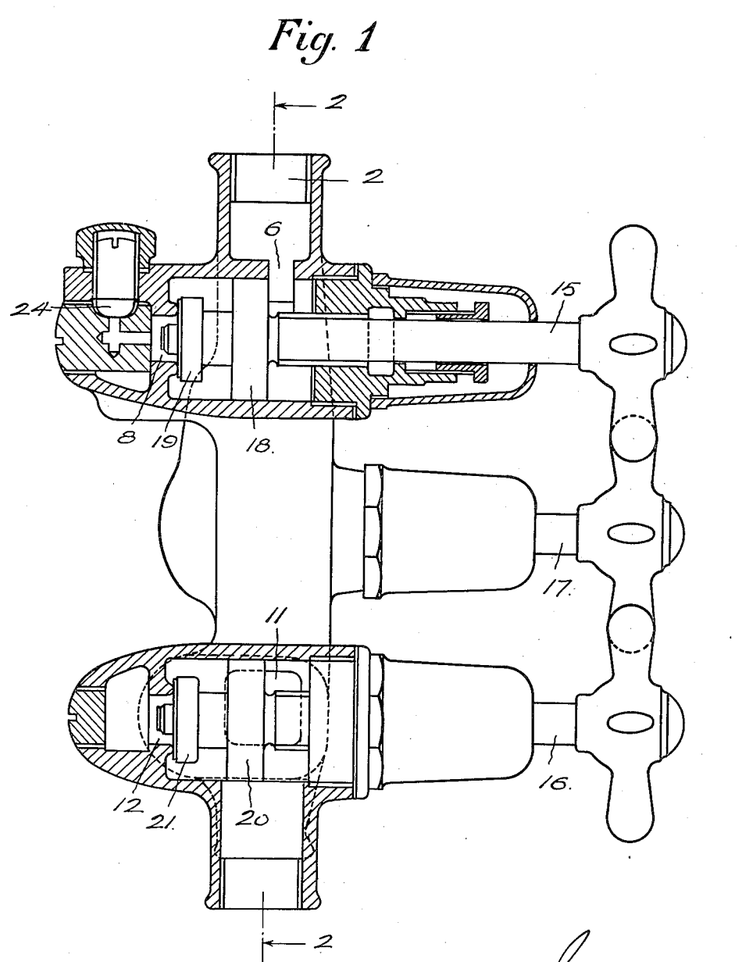
Figure 1 is a vertical section of a three-valve fitting designed for the control of a water softener in which the normal direction of flow is downward through the softener, the section being taken through the axes of two of the valves.
Figure 2:
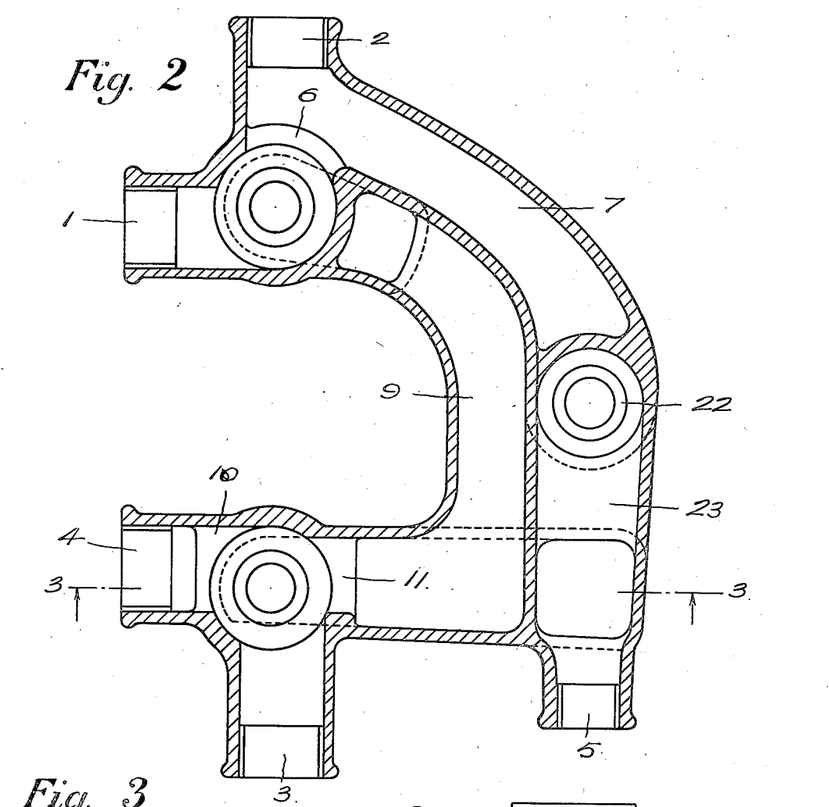
Figure 2 is a vertical section on the line 2—2 of Figure 1.
Figure 3:
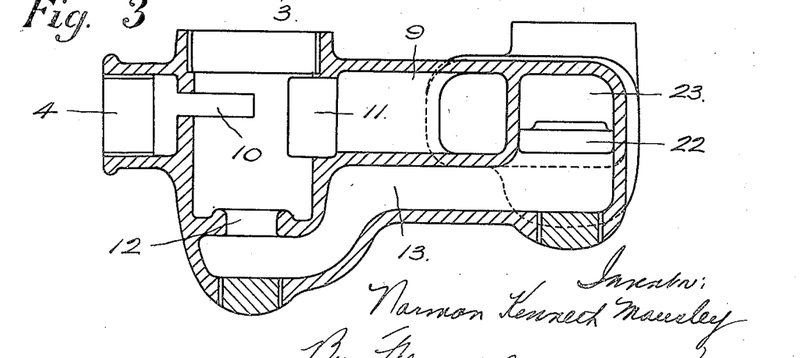
Figure 3 is a horizontal section on the line 3—3 of Figure 2.

In the fitting illustrated in Figures 1, 2 and 3 the body of the fitting is provided with four connection 1, 2, 3 and 4 to receive pipes, and an outlet 5 leading to a drain. The connection 1 is adapted to receive a pipe from a hard water supply, the connections 2 and 3 pipes leading to the upper and lower ends of the softener respectively, and the connection 4 a pipe leading to the soft water delivery line.

The connection 1 is in communication through a port 6 with the connection 2 and with an internal passage 7 in the body, and through a seating 8 with an internal passage 9 in the body. The connection 3 is in communication through a port 10 with the connection 4 and through a port 11 with the passage 9, and through a seating 12 with a passage 13 leading to the drain outlet 5.

The fitting contains three screw-down valve spindles 15, 16 and 17 operated by the usual headwork, and the spindle 15 carries a plunger 18 controlling the port 6 and a washered head 19 adapted to engage the seating 8. The spindle 16 carries a plunger 20 controlling the ports 10 and 11 and a washered head 21 adapted to engage the seating 12. The spindle 17 simply carries a washered head adapted to engage a seating 22 between the passage 7 and a passage 23 leading to the drain outlet 5.

In the normal operation of the softener the valves are in the positions shown in the drawings, which will hereinafter be referred to as the closed position, all the washered heads being engaged with their seatings. Water enters the fitting by the connection 1 and flows through the port 6 and connection 2 to the upper end of the softener. After flowing through the softener the softened water returns to the fitting by the connection 3 and passes through the port 10 to the delivery connection 4.

For back-flushing, the valves 15 and 17 are opened. The plunger 18 closes the port 6 and water flows through the seating 8 into the passage 9 and so to the connection 3 from which it passes into the lower end of the softener. The water thus displaced from the softener returns to the fitting by the connection 2 and flows by way of the passage 7, the seating of the valve 17, and the passage 23 to the drain outlet 5.

To drain the softener prior to the insertion of salt or of brine solution for regeneration the valve 16 is opened, the supply of water to the connection 1 being shut off by a stop-tap or other means, and water drains out of the softener through the connection 3, seating 12, and passage 13 to the drain outlet.

The valves 15 and 17 are then closed and water is again permitted to enter the fitting by the connection 1. The rate of flow may be accelerated to bring the level of the water in the softener to the top again and then regulated to maintain it there against the draining effect of the open valve 16 and the drain outlet while the salt cap is replaced.

For washing out the softener after salting the position of the valves is left unchanged and water from the connection 1 flows through the port 6 and the connection 2 to the upper end of the softener and returns by the connection 3 and passes through the seating 12 and passage 13 to the drain outlet 5.

When washing out is completed the valve 16 is closed so that all the valves are again in the closed position and the softener is ready to resume its normal operation.

If desired one or more adjustable flow regulators such as that shown at 24 in Figure 1 may be incorporated with the fitting. This regulator permits the rate of flow when back-flushing to be controlled to guard against loss of the softening material.

Similar regulators may also be provided to limit the rate of flow when washing-out after salting and to control the rate of flow during normal operation of the softener.

If it should be desired to draw hard water from the fitting it is only necessary to open the valve 17 and water will flow through the port 6, passage 7, seating 22 and passage 23 to the drain outlet 5. Thus hard water is by-passed to the drain without disturbing the normal flow of water to the house system through the softener by way of the port 6 and connection 2, and the hard water may be delivered to a hose or the like connected to the drain outlet or allowed to flow into any convenient receptacle.

Figure 4:
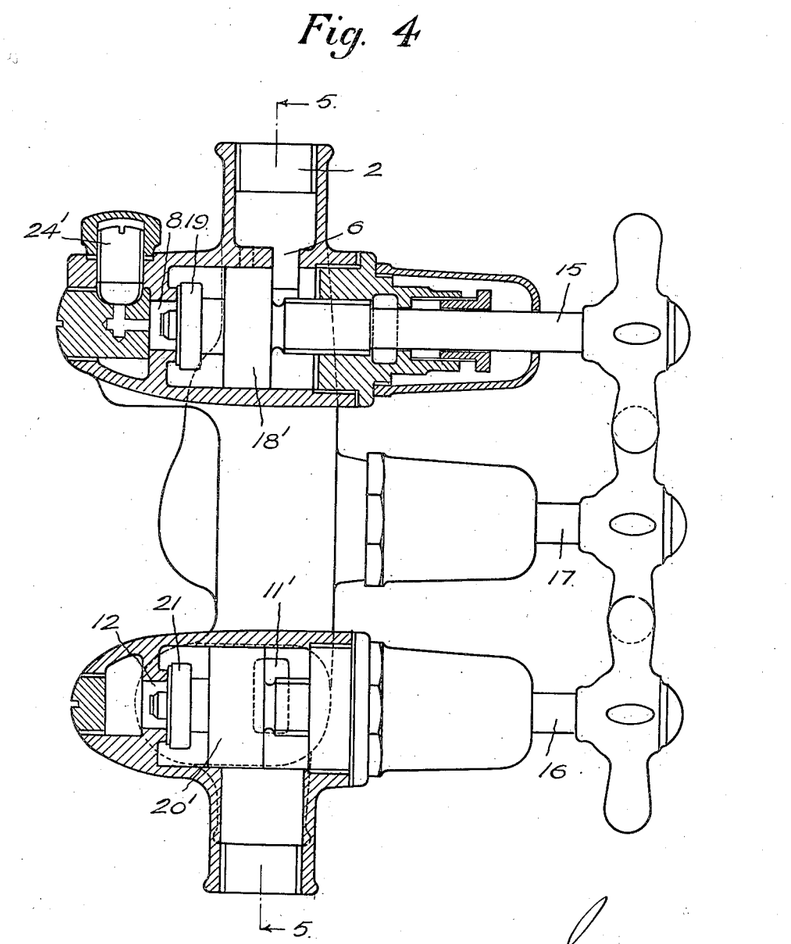
Figure 4 is a vertical section similar to Figure 1 of a slightly modified form of fitting.
Figure 5:
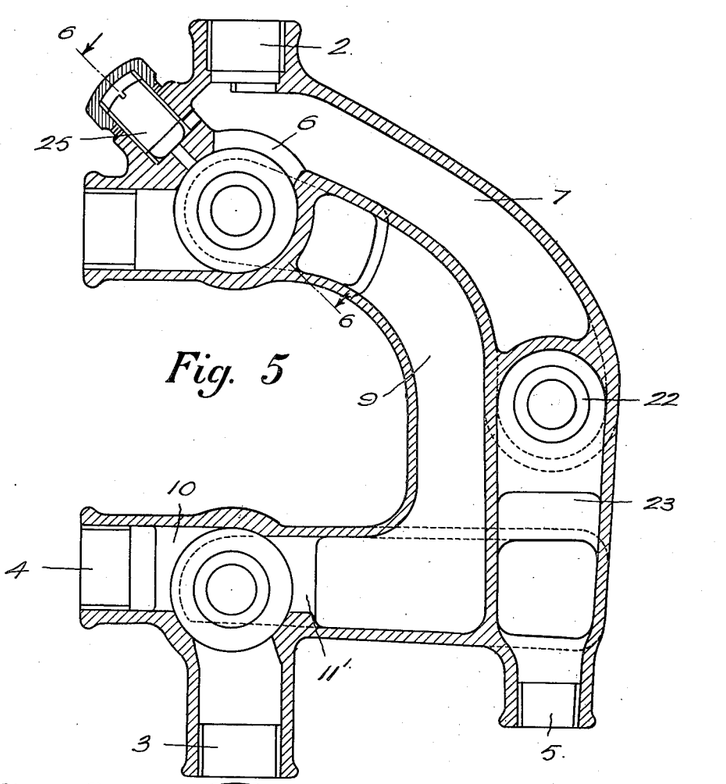
Figure 5 is a vertical section on the line 5—5 of Figure 4.
Figure 6:
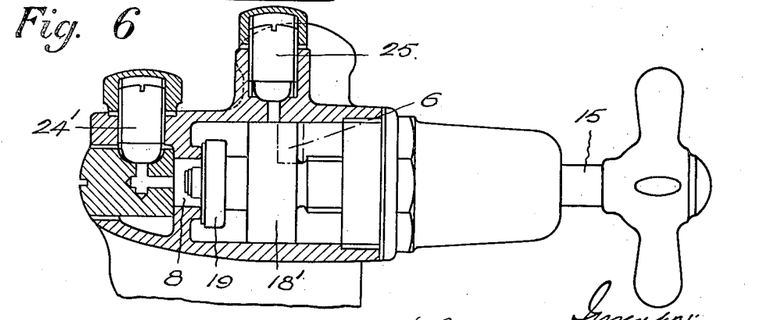
Figure 6 is a section on the line 6—6 of Figure 5.

Figures 4, 5 and 6 show a slightly modified design of the fitting illustrated in Figures 1, 2 and 3. The plunger 20' is of greater axial length than the plunger 20 and the port 11' is narrower than the port 11 so that when the valve 16 is opened the plunger 20' closes the port 11'. Thus when both valves 15 and 16 are open the hard water supply is isolated in the valve 15 and the passage 9. With this arrangement the external means for controlling the flow of water into the connection 1 during regeneration of the softener can be dispensed with. The rate of flow for filling up the softener after draining and maintaining the water level at the desired height while replacing the salt cap can be controlled by partially closing and re-opening the valve 15.

Adjustable flow regulators for controlling the rate of flow during back-flushing and washing-out can readily be incorporated with this form of fitting. The regulator 24' shown in Figures 4 and 6 serves to control the rate of flow of water into the passage 9 while back-flushing, and the regulator 25 shown in Figures 5 and 6 serves to control the rate of flow to the connection 2 when washing-out which is done with the valve 15 open, in which position the port 6 is closed and the inlet to the regulator 25 open.

Thus with this form of fitting provided with two flow regulators the operation is extremely simple. After back-flushing, the valve 15 is left open and the valve 16 is opened for draining, the valve 17 is closed and the valve 15 is partially closed for filling up the softener and the valve 15 is re-opened sufficiently far to keep the water level steady while the salt cap is replaced. The valve 15 is then opened fully to give the correct flow for washing out, and finally both the valves 15 and 16 are closed to revert to the conditions for normal flow through the softener.

Figure 7:
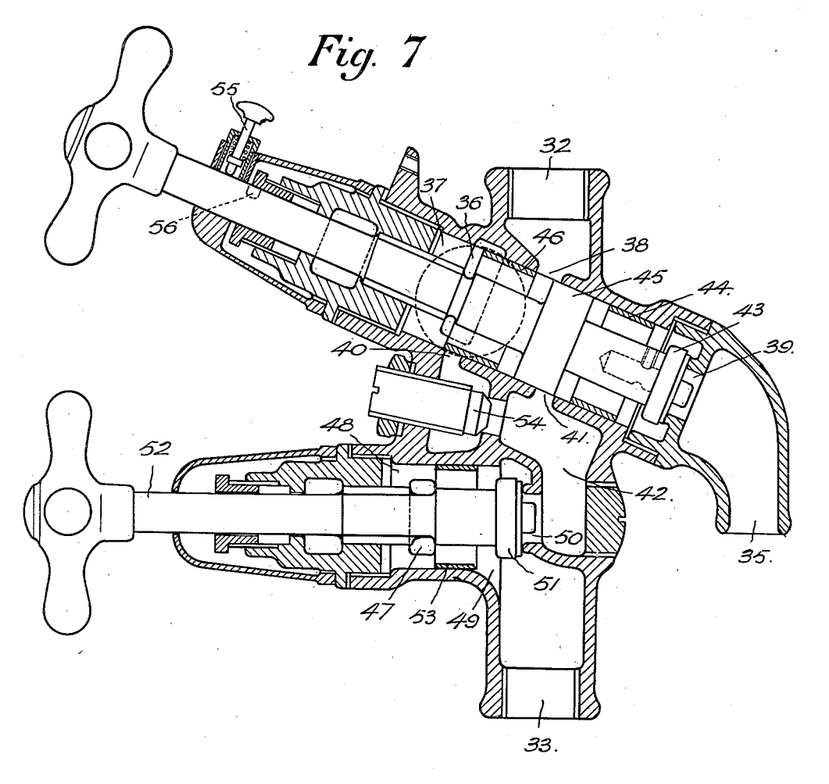
Figure 7 is a vertical section of a two-valve fitting designed for use with a softener in which the normal flow is downward through the softener, the section being taken on the axes of the valves and the valves being shown in the normal position.
Figures 8, 9:
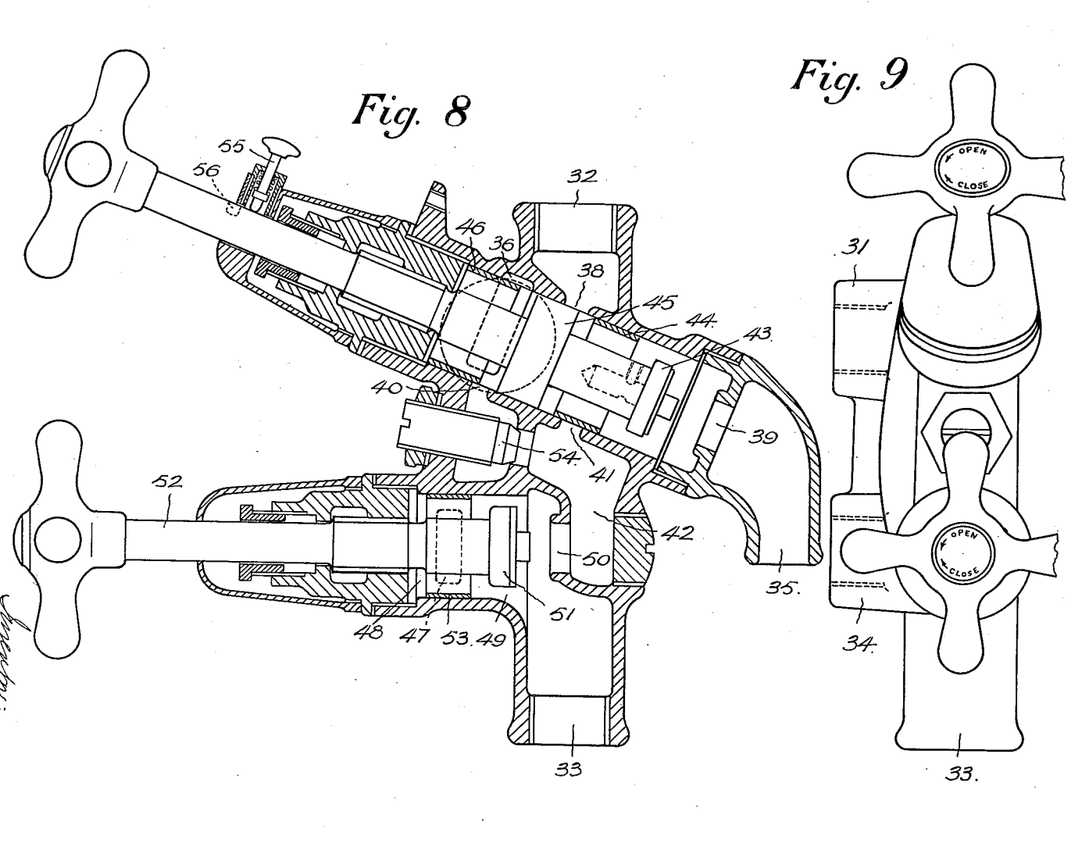
Figure 8 is a similar section showing the valves in the open position into which they are moved when the softener is being back-flushed.
Figure 9 is an end elevation of the fitting.

The fitting illustrated in Figures 7, 8 and 9 is designed for controlling by means of only two screw-down valve spindles a softener in which the normal direction of flow is downward through the softener.

The body of the fitting is provided with four pipe connections 31, 32, 33, 34 adapted to be connected respectively with a hard water supply, with the upper and lower ends of the softener, and with a soft water delivery, and there is also a drain outlet 35. The connection 31 is in communication through a port 36 with a cylindrical bore 37 in the body and the connection 32 communicates with the bore through a port 38, while a seating 39 at one end of the bore leads into the drain outlet. Further spaced ports 40 and 41 in the side of the bore lead into an internal passage 42 in the body. Working in the bore 37 is a screw-down valve spindle operated by the usual headwork and on the end of the spindle is a washered head 43 adapted to engage the seating 39, while at intermediate points on the spindle are mounted a ring or sleeve 44, a solid plunger 45, and a ring 46 all of which are a good working fit in the bore.

The connection 34 is in communication through a port 47 with a second cylindrical bore 48 in the body and the connection 33 communicates with this bore through an opening 49. At the end of the bore is a seating 50 leading into the passage 42 and adapted to be engaged by a washered head 51 on a screw-down spindle 52 which carries a ring or sleeve 53 for controlling the port 47.

During the normal operation of the softener the valves are in the closed position as shown in Figure 7, the washered heads on the spindles being engaged with their seatings.

Water entering the fitting by the connection 31 flows through the port 36, ring 46 and port 38 to the connection 32 and so to the upper end of the softener. The softened water returning from the softener enters the fitting by the connection 33 and flows through the opening 49, ring 53 and port 47 to the soft water delivery connection 34.

For back-flushing both valves are opened fully into the position shown in Figure 8.

Water entering the fitting by the connection 31 is diverted through the port 40 into the passage 42 and flows through the seating 50 into the connection 33 and so to the bottom end of the softener. The water displaced from the softener returns to the fitting by the connection 32 and flows through the port 38, ring 44 and seating 39 to the drain outlet, the ring 44 meanwhile keeping the port 41 leading to the passage 42 closed.

For draining the softener to permit the insertion of salt or of brine solution the second valve remains open while the first is closed down into a position in which the port 36 is closed by the ring 46, and water drains out of the softener by way of the connection 33 opening 49, seating 50, passage 42, port 41, ring 44, and seating 39 to the drain outlet.

For filling up and/or washing out the softener the first valve is closed down further until the ring 46 uncovers the port 36 sufficiently to allow water to flow at the desired rate into the fitting. This water is directed by the plunger 45 through the port 38 into the connection 32 and so on to the upper end of the softener. Water from the lower end of the softener enters the fitting by the connection 33 and flows by way of the opening 49, seating 50, passage 42, port 41, ring 44 and seating 39 to the drain outlet. None of this washing out water can pass to the soft water delivery as the port 47 leading to the connection 34 is closed by the ring 53.

When washing-out is complete both valves are closed down into the position shown in Figure 7 and normal operation of the softener is resumed.

If desired an adjustable regulator such as shown at 54 may be arranged between the port 40 and the passage 42 to determine the rate of flow of the water when back-flushing.

To define the position of the first valve for draining a detent may be provided such as the spring-pressed plunger 55 adapted to engage frictionally or positively in a recess 56 in the valve spindle to arrest the spindle in the correct position. This detent may be so arranged that it is in-operative in the opening movement of the spindle. An adjustable regulator to control the rate of flow during washing-out may be incorporated in the fitting and may be so arranged that the position of the valve defined by the detent is also the position of the valve for washing-out.

Figures 10, 11, 12:
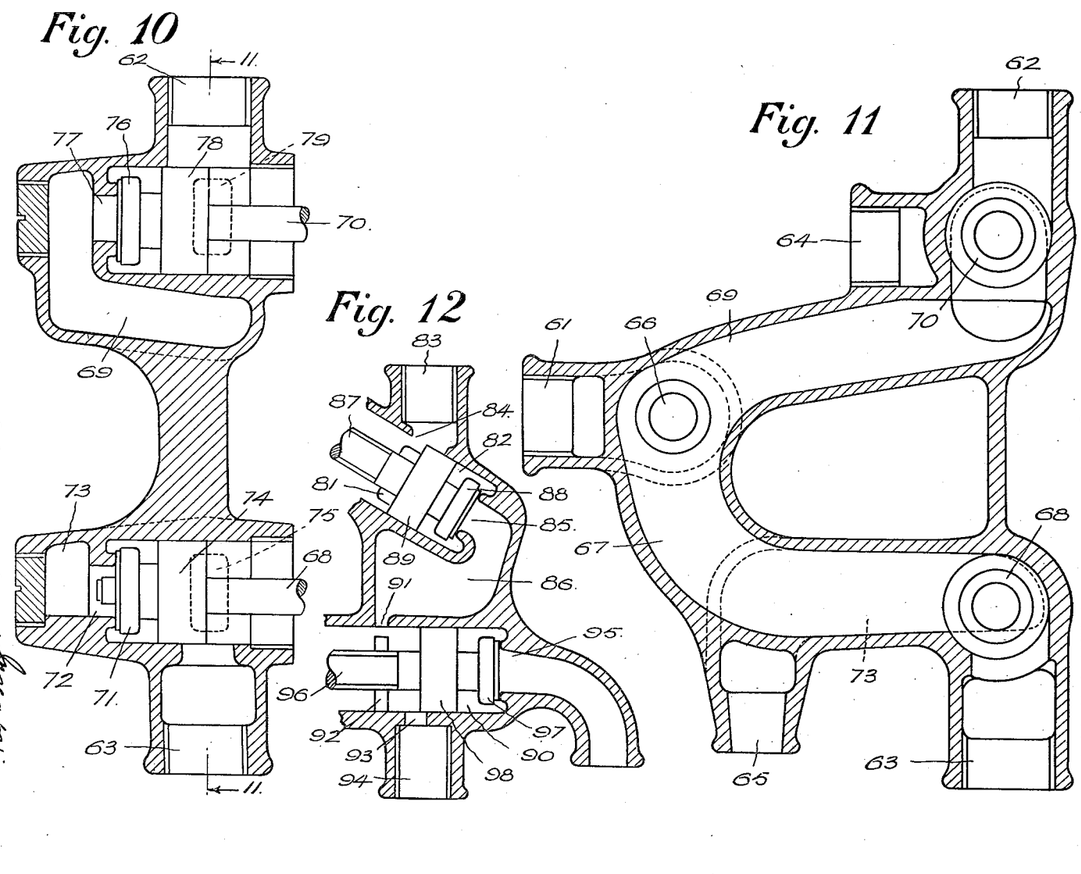
Figure 10 is a vertical section of a three-valve fitting designed for use with a softener in which the normal flow is upward through the softener.
Figure 11 is a vertical section on the line 11—11 of Figure 10.
Figure 12 is a vertical section of a two-valve fitting designed for use with a softener in which the normal flow is upward through the softener.

Figures 10 and 11 of the drawings show a three-valve fitting for use with a softener in which the normal direction of flow through the softener is upward and in which back-flushing of the softener is not required. The fitting again has four pipe connections 61, 62, 63, 64 adapted to be connected respectively to a hard water supply, the upper and lower ends of the softener, and a soft water delivery, and there is a drain outlet 65. A washered head on a valve 66 is adapted, when the valve is open, to direct water entering by the connection 61 into an internal passage 67 leading to the valve 68 and into a passage 69 leading to the valve 70, the further flow of the water being controlled by the valves 68 and 70. The valve 68 carries a washered head 71 adapted to engage a seating 72 leading into a passage 73 connected with the drain outlet 65, and a plunger 74 controlling a port 75 communicating with the passage 67. The valve 70 similarly carries a washered head 76 adapted to engage a seating 77 in communication with the passage 69 and a plunger 78 controlling a port 79 leading to the connection 64.

In the normal operation of the softener the valve 66 is open and the valves 68 and 70 closed. Water from the connection 61 enters through the valve 66 below the seating and flows through the passage 67, the port 75 and the connection 63 to the bottom of the softener.

Softened water from the upper end of the softener enters the fitting by the connection 62 and flows through the valve 70 above its seating to the soft water delivery connection 64.

For draining the softener the valve 66 is closed and valves 68 and 70 are opened so that water drains from the softener through the seating 72 of the valve 68 and the passage 73 to the drain outlet, and at the same time water is prevented from being drained from the house system through the connection 64.

The valve 66 is then re-opened and water flows through the passage 69, valve 70 and connection 62 to the upper end of the softener, the port 75 being closed by the plunger 74. The rate of flow may be accelerated to bring the level of the water in the softener up to the top again before replacing the salt cap, and this pocess may be assisted if desired by closing the valve 68, and thus closing the outlet to the drain and permitting water to flow to the lower as well as the upper end of the softener.

To wash out the softener after salting all three valves are open so that water flows through the passage 69, valve 70 and connection 62 to the upper end of the softener and returns from the lower end through connection 63, valve 68 and passage 73 to the drain outlet, the house system being kept isolated by the plunger 78 of valve 70.

When washing out is complete the valves 68 and 70 are closed and normal operation of the softener is resumed.

The two-valve fitting illustrated in Figure 12 is designed for use with a softener in which the normal flow is upward through the softener.

A pipe connection for the delivery of softened water communicates through a port 81 with a cylindrical bore 82 in the body of the fitting, and a pipe connection 83 adapted to be connected to the upper end of the softener communicates with the bore 82 through a port 84. The inner end of the bore is provided with a seating 85 leading into an internal passage 86 in the body, and a screw-down spindle 87 arranged axially in the bore carries a washered head 88 adapted to engage the seating 85 and a plunger 89 adapted to control the ports 81 and 84.

A second cylindrical bore 90 in the body has in its walls a port 91 in communication with the internal passage 86, a port 92 leading to a pipe connection from a hard water supply, and a port 93 leading into the pipe connection 94 which is connected to the lower end of the softener. At the inner end of the bore is a seating 95 leading into a drain outlet, and a screw-down valve spindle 96 arranged axially in the bore carries a washered head 97 adapted to engage the seating 95 and a plunger 98 adapted to control the ports 91, 92, 93.

In the normal operation of the softener the valves are in the position shown, both washered heads being engaged with their seatings.

Hard water entering by the port 92 flows through the port 93 into the pipe connection 94 and so to the lower end of the softener. Softened water from the upper end of the softener returns by the pipe connection 83 and flows through the ports 84 and 81 into the soft water delivery connection.

To drain the softener both valves are opened fully so that the plunger 98 closes the port 92 and water from the softener can flow by way of the connection 94, port 93, and seating 95 to the drain outlet, the plunger 89 meanwhile closing the port 81 to prevent water draining back out of the house system.

For filling up and washing out the softener the second valve is screwed down to uncover the port 92 to an extent sufficient to give the required rate of flow. Water from the port 92 flows through the port 91 into the passage 86 and through the seating 85 into the bore 82 and by way of the port 84 and pipe connection 83 to the upper end of the softener. When washing out, water from the lower end of the softener enters the fitting by the pipe connection 94 and flows by way of the port 93, bore 90 and seating 95 to the drain outlet.

When washing out is complete both valves are closed and normal operation of the softener is resumed.

I claim:

1. A valve fitting particularly adapted for controlling the flow of water comprising a body, four pipe connections and a drain outlet on said body, internal passages and ports in the body establishing communication between said connections and drain outlet, and two valves by one of which water entering through one pipe connection can be directed to a second pipe connection or through the body to the second valve and water coming from the second valve or entering through the second pipe connection can be directed to the drain outlet, and by the other of which water entering through a third pipe connection can be directed to a fourth pipe connection or through the body and the first valve to the drain outlet and water coming through the body from the first valve can be directed to the third pipe connection.

2. A valve fitting particularly adapted for controlling the flow of water comprising a body, four pipe connections and a drain outlet on said body, an internal passage and ports in the body establishing communication between said connections drain outlet and passage, and two valves by one of which water entering through one pipe connection can be directed into a second pipe connection or through the passage in the body to the second valve and water entering through the second pipe connection can be directed to the drain outlet, and by the other of which water entering through the third pipe connection can be directed to the fourth pipe connection or water coming through the body from the first valve can be directed into the third pipe connection.

3. A valve fitting particularly adapted for controlling the flow of water comprising a body, four pipe connections and a drain outlet on said body, passages in said body establishing communication between the pipe connections and the drain outlet, and three valves controlling ports in said passages, one valve being adapted to direct water entering through one pipe connection directly to a second pipe connection or through a passage and a second valve to a third pipe connection, and the second valve being adapted to direct water entering through the third pipe connection to the fourth pipe connection or to the drain outlet, and the third valve being adapted to direct water entering by the first pipe connection into the second pipe connection or into the drain outlet or to direct water entering by the second pipe connection into the drain outlet.

4. A valve fitting particularly adapted for controlling the flow of water, comprising a body, four pipe connections and a drain outlet on said body, three valves mounted in said body, and two passages in said body leading from one valve to the other two valves, the first valve controlling the flow of water from one pipe connection into the passages leading to the other two valves of which one controls the flow of water to a second pipe connection and to or from a third pipe connection and the other of which controls the flow of water to or from the fourth pipe connection and to the drain outlet.

5. A valve fitting for controlling the flow of water comprising a body, four pipe connections on said body of which two are adapted to be connected to the top and bottom of a softener and the other two to a hard water inlet and soft water delivery respectively, a drain outlet from said body, an internal passage in said body establishing communication between the pipe connections and the drain outlet, a screw-down valve spindle mounted in a bore in said body carrying a washered head adapted to engage a seating in the bore leading to a drain outlet and spaced annular valve members controlling ports in the bore in communication respectively with the hard water inlet connection and the connection leading to one end of the softener and two further ports leading into the internal passage in the body, and a second screw-down valve spindle mounted in a second bore in the body and carrying a washered head adapted to engage a seating in the bore between the internal passage and the pipe connection leading to the other end of the softener and an annular valve member controlling a port in the bore leading to the soft water delivery connection.

6. A valve fitting for controlling the flow of water comprising a body, four pipe connections on said body of which two are adapted to be connected to the top and bottom of a softener and the other two to a hard water inlet and soft water delivery respectively, a drain outlet from said body, an internal passage in said body establishing communication between the pipe connections and the drain outlet, a screw-down valve spindle mounted in a bore in said body carrying a washered head adapted to engage a seating in the bore leading to a drain outlet and spaced annular valve members controlling ports in the bore in communication respectively with the hard water inlet connection and the connection leading to one end of the softener and two further ports leading into the internal passage in the body, and a second screw-down valve spindle mounted in a second bore in the body and carrying a washered head adapted to engage a seating in the bore between the internal passage and the pipe connection leading to the other end of the softener and an annular valve member controlling a port in the bore leading to the soft water delivery connection, normal operation of the softener taking place with both valves screwed down so that the washered heads engage their seatings, back-flushing of the softener taking place with both valves open, and draining and washing-out of the softener taking place with one valve fully open and the other in an intermediate position.

7. A valve fitting for controlling the flow of water comprising a body, four pipe connections on the body adapted to be connected respectively to the top and bottom of a softener to a hard water inlet and to a soft water delivery, a drain outlet from the body, two spaced bores in the body, ports and seatings in the bores in communication with the pipe connections and drain outlet and with an internal passage in the body, a screw-down valve spindle mounted in one bore and carrying a washered head adapted to engage a seating at one end of the bore leading to the drain outlet and an annular valve member controlling ports in communication respectively with the hard water inlet, with the pipe connection leading to one end of the softener and with the internal passage in the body, and a second screw-down spindle mounted in the other bore and carrying a washered head adapted to engage a seating at one end of the bore leading into the internal passage in the body and an annular valve member controlling ports in communication respectively with the pipe connection leading to the other end of the softener and with the soft water delivery connection.

8. A valve fitting comprising a body, four pipe connections on said body comprising a connection with a water main for delivering water to said body, a second connection for delivering water from said body, a third connection for delivering water to and from said body, and a fourth connection for delivering water to and from said body, a drain outlet from said body, said body having intercommunicating passages arranged therein and establishing communication between certain of said connections and between certain of said connections and said drain outlet, and not more than three multi-way screw down valves in said body, of which valves at least one selectively controls certain of said passages whereby water entering said body through said connection from said main can be directed selectively through one of said third and fourth connections at least one valve selectively controls certain of said passages whereby water entering said body through one of said third and fourth connections can be directed through said drain outlet, and at least one valve selectively controls certain of said passages whereby water entering said body through one of said third and fourth connections can be directed through said water delivery connection.

9. A valve fitting comprising a body, four pipe connections on said body comprising a connection with a water main for delivering water to said body, a second connection for delivering water from said body, a third connection for delivering water to and from said body, and a fourth connection for delivering water to and from said body, a drain outlet from said body, said body having intercommunicating passages arranged therein and establishing communication between certain of said connections and between certain of said connections and said drain outlet, and not more than three multi-way screw down valves in said body, said valves having stems, at least one valve carrying a washered head, a seat in said body adapted to be engaged by said head, at least one annular member carried by the stem of said valve and spaced from said head, said annular member being adapted to control certain of said passages whereby water entering said body through said connection with said main can be directed selectively through one of said last named connections, at least one valve selectively controls certain of said passages whereby water entering said body through one of said third and fourth connections can be directed through said drain outlet, and at least one valve selectively controls certain of said passages whereby water entering said body through one of said third and fourth connections can be directed through said water delivery connection.

10. A valve fitting comprising a body, four pipe connections on said body comprising a connection with a water main for delivering water to said body, a second connection for delivering water from said body, a third connection for delivering water to and from said body, and a fourth connection for delivering water to and from said body, a drain outlet from said body, said body having intercommunicating passages arranged therein and establishing communication between certain of said connections and between certain of said connections and said drain outlet, and not more than three valves mounted in said body, each of said valves including a screw-down spindle carrying a washered head, valve seats in said body adapted to be engaged by said heads, at least one annular member carried by each of said spindles of said valves in spaced relation to the heads thereof, each of said annular members being adapted to cooperate with certain of said passages to control the flow of water in different directions through said body.

11. A valve fitting comprising a body, four pipe connections on said body comprising a connection with a water main for delivering water to said body, a second connection for delivering water from said body, a third connection for delivering water to and from said body, and a fourth connection for delivering water to and from said body, a drain outlet from said body, said body having intercommunicating passages arranged therein and establishing communication between certain of said connections and between certain of said connections and said drain outlet, and not more than three multi-way screw down valves in said body, of which valves at least one selectively controls certain of said passages whereby water entering said body through said connection from said main can be directed selectively through one of said third and fourth connections at least one valve selectively controls certain of said passages whereby water entering said body through one of said third and fourth connections can be directed through said drain outlet, and at least one valve selectively controls certain of said passages whereby water entering said body through one of said third and fourth connections can be directed through said water delivery connection, and adjustable means in said body independent of said valves for regulating the rate of flow of water through said body to and from at least one of said pipe connections.

12. A valve fitting for controlling the flow of water, comprising a body, four pipe connections in said body, one of said connections being adapted for delivering water to said body from a main, the second connection being adapted for delivering water from said body to a house system, and each of the third and fourth connections being adapted to deliver water both to and from said body, a drain outlet from said body, internal passages in said body establishing communication between said pipe connections and said drain outlet, three screw-down valve spindles mounted in said body, one spindle carrying a washered head adapted to engage a seating and carrying also an annular valve member controlling a port in said body, said head and annular member comprising means whereby water entering said body through said first connection is directed selectively through one of said third connections and a passage in said body leading to a second valve, said second spindle also carrying a washered head adapted to engage a seating and an annular member controlling a second port in said body, said last named head and annular member comprising means whereby water entering said body through said fourth pipe connection can be directed selectively to said second pipe connection and drain outlet and also comprising means whereby water coming from said passage in said body can be directed through said fourth pipe connection, and the third valve spindle carrying means whereby water entering said body through said first connection and said first valve is normally directed through said third connection but said third valve means being adjustable whereby to direct said water and water entering said body through said third connection through said drain.

13. A valve fitting for controlling the flow of water, comprising a body, four pipe connections in said body, one of said connections being adapted for delivering water to said body from a main, the second connection being adapted for delivering water from said body to a house system, and each of the third and fourth connections being adapted to deliver water both to and from said body, a drain outlet from said body, internal passages in said body establishing communication between said pipe connections and said drain outlet, bores in the body having ports and seatings in communication with the pipe connections, drain outlet and internal passages, a screw-down valve spindle in one bore carrying a washered head which when moved away from its seating directs water entering said body through said first pipe connection into said passages leading to the other bores, a screw-down valve spindle in the second bore carrying a washered head adapted to engage a seating and carrying also an annular member controlling ports, said head and annular member comprising means by which water coming from the first passage can be directed through said third pipe connection and by which water entering said body through said third pipe connection can be directed to said drain outlet, and a screw-down valve spindle in the third bore carrying a washered head adapted to engage a seating and carrying also an annular member controlling ports, said head and annular member comprising means by which water entering said body through said fourth connection can be directed through said second pipe connection and whereby water coming from the second passage can be directed through said fourth pipe connection.

NORMAN KENNETH MOUSLEY.